No. 649,604. Patented May 15, 1900.
P. O. HIRSCH.
MILK COOLER, AERATOR, AND SEPARATOR.
(Application filed Feb. 27, 1900.)
(No Model.) 2 Sheets—Sheet 1.
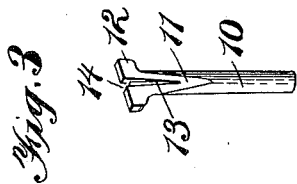
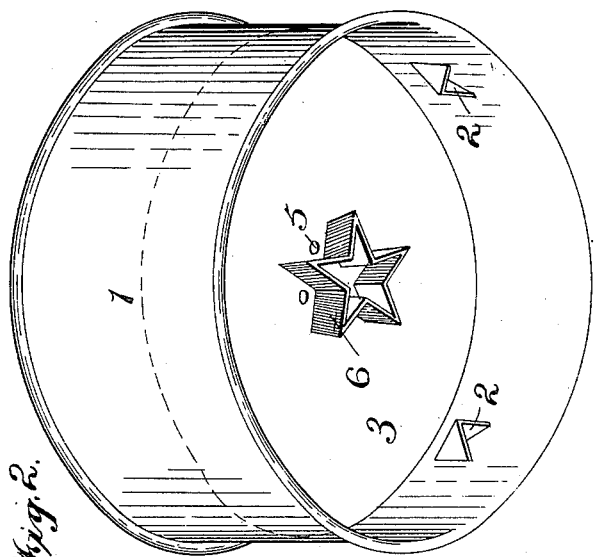
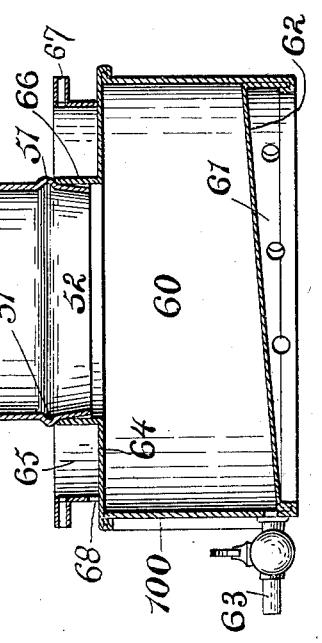
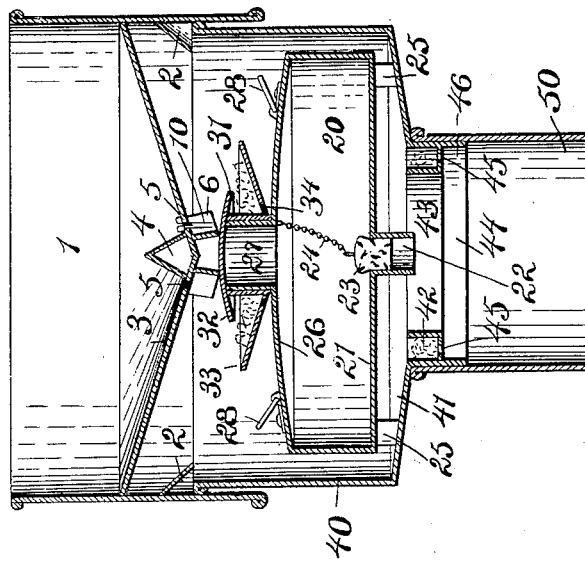
Witnesses:
Geo. E. Fuch.
R. P. Herrick.
Inventor:
Philip O. Hirsch,
by Collamer & Co.,
Attorneys.
THE NORRIS PETERS CO., PHOTO-LITHO., WASHINGTON, D. C.

No. 649,604. Patented May 15, 1900.
P. O. HIRSCH.
MILK COOLER, AERATOR, AND SEPARATOR.
(Application filed Feb. 27, 1900.)
(No Model.) 2 Sheets—Sheet 2.
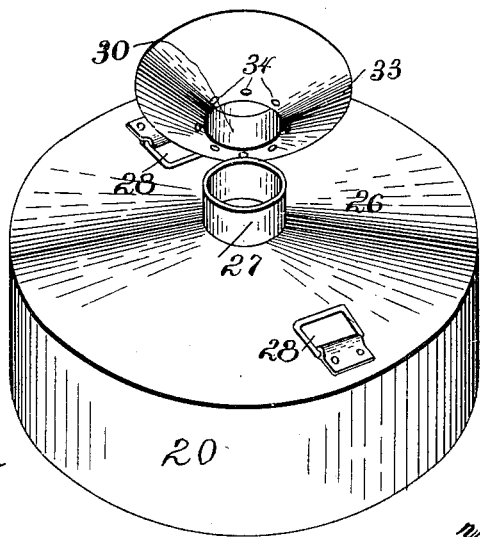
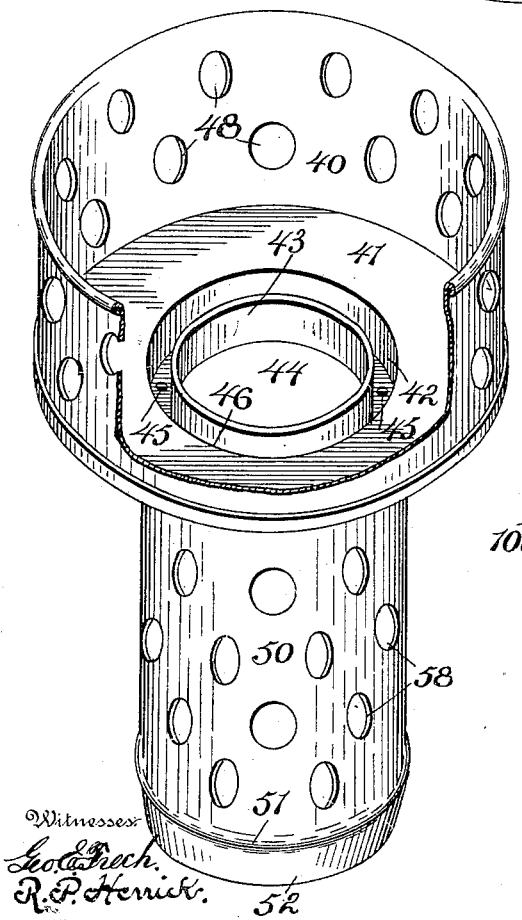
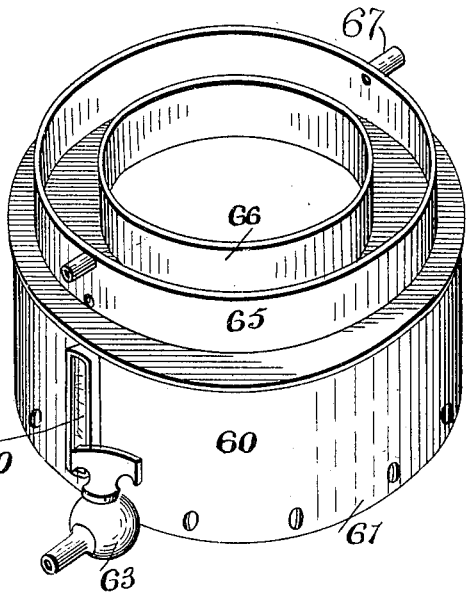

UNITED STATES PATENT OFFICE.

PHILIP O. HIRSCH, OF NORFOLK, NEBRASKA.

MILK COOLER, AERATOR, AND SEPARATOR.

SPECIFICATION forming part of Letters Patent No. 649,604, dated May 15, 1900.

Application filed February 27, 1900. Serial No. 6,707. (No model.)

*To all whom it may concern:*

Be it known that I, PHILIP O. HIRSCH, a citizen of the United States, and a resident of Norfolk, Madison county, State of Nebraska, have invented certain new and useful Improvements in Milk Coolers, Aerators, and Separators; and my preferred manner of carrying out the invention is set forth in the following full, clear, and exact description, terminating with claims particularly specifying the novelty.

This invention relates to milk-coolers, and more especially to that class thereof which involves the circulation of the milk; and the object of the same is to produce a combined milk-cooler and cream-separator.

To this end the invention consists in an apparatus whose preferred form of construction is hereinafter more fully described and claimed and as illustrated in the accompanying drawings, wherein—

Figure 1 is a central vertical section of this combined milk-cooler and cream-separator complete. Fig. 2 is a perspective view of the receiver, taken from the under side. Fig. 3 is a detail of one of a number of plugs I sometimes employ for retarding the flow of milk from the receiver. Fig. 4 is a perspective detail of the water-tank viewed from the upper side and the stopper thereof removed and viewed from the under side. Fig. 5 is a perspective view of the cooling-chamber and stand-pipe looking obliquely into the top of the former, whose near side is broken away, the walls of these parts being here shown as perforated, which is a modified construction I may sometimes use. Fig. 6 is a perspective view of the separating-chamber viewed from the upper side.

*The receiver.*—In the present case this comprises a cylindrical body 1, having near its lower edge internal feet 2 to rest on the upper edge of the cooling-chamber described below. The bottom 3 of the reservoir inclines from its periphery, which is secured within the body about midway between its upper and lower edges, downward and inward to its center, from which rises a cone 4, surrounded by a number of fine feed-openings 5. In Fig. 2 is shown a spreader 6, consisting in the present instance of a narrow strip of metal corrugated into star shape and secured beneath the center of the bottom 3, so that the openings 5 stand above the reentrant angles.

*The regulator.*—In Fig. 3 is shown a plug, which consists of a cylindrical body 10, flattened on opposite sides at its upper end, as at 11, and having an enlarged head 12 projecting from the edges of said flattened portions. In some cases grooves 13 may be cut into these flattened portions and may grow deeper toward their upper extremities, which meet in a notch 14, passing transversely across the head. The body of this plug is of a size to loosely fit one of the feed-openings 5, and when in place its flattened sides and its grooves and notch restrict but permit the flow of liquid through this opening, as described below.

*The water-tank.*—In Fig. 4 is best seen the water-tank, which here consists of a cylindrical body 20, with a flat bottom 21, having a central depending exhaust-tube 22, adapted to be closed by a cork 23, which can be hung on a chain 24. Said bottom has feet 25 raising it slightly above the bottom of the cooling-chamber hereinafter described. The side walls of the body are perfectly vertical, while the top 26 inclines upward from its periphery to a central raised collar 27, surrounding the inlet-opening, and into which collar said chain 24 may be attached, so that it can be reached and the cork withdrawn from above. Two or more handles 28 may be secured, as by hinges, upon this top 26.

*The stopper.*—Fig. 4 also best shows the stopper for said inlet-opening, which consists of a cap 30 of a size to surround the collar 27 and closed at its top by a cover 31, which is slightly convex on top and of greater diameter than the cap 30, so as to form a projecting and encircling flange 32. Surrounding the cap 30 is a collector, which consists of a wide sheet-metal strip 33, secured at its inner edge to the lower end of the cap 30 and diverging radially and rising gradually upward in all directions therefrom, so as to catch the liquid falling from the spreader and convey it inward toward the cap. Through this collector, near the cap, are formed holes 34, through which the liquid drips onto the water-tank, as described below.

*The cooling-chamber.*—This term is used to cover that portion of the device wherein the cooling of the milk takes place and which is obviously produced by the water-tank. The chamber itself is the space surrounded by a cylinder 40, which fits within the lower end of the receiver, so that the feet in the latter rest on the upper end of the cylinder, as above described. The bottom 41 of this cylinder inclines from its periphery inward to a large annular groove 42, which surrounds a flange 43, which in turn surrounds a central opening 44. The bottom of the groove is formed by a strip having outlet-holes 45, whereby the milk flowing down the bottom 41 drops into the groove and through the holes. The outer wall of the groove is preferably an upright collar 46, fitting into the stand-pipe next described, although it will be clear that this collar and stand-pipe could be made in one piece.

*The stand-pipe.*—This consists of an upright cylinder 50, preferably having near its lower end a bead 51, below which it may be reduced, as at 52, for a purpose to be described. In Fig. 1 the cylinders 40 and 50 are shown as of solid sheet metal, while in Fig. 5 they are shown as provided with large perforations 48 and 58. The latter is a modified construction which I may employ, if desired, for the purpose of admitting air to the flowing milk, so as to effect its aeration.

*The separator.*—Fig. 6 best shows this as consisting of a cylindrical body 60, having a perforated flange 61 at its lower edge to admit air beneath its bottom 62. The latter is preferably inclined toward a cock or faucet 63 for drawing off the milk from beneath the cream when desired. The top 64 of this separator may be flat or also inclined, and it is surrounded by a flange 65, which may be pierced with inlet and outlet openings, so that a constant stream of cold water can pass over this top and around the channel formed between the outer flange 65 and an inner flange 66. The lower end 52 of the stand-pipe fits into this flange, (or might in some cases be made a part thereof,) and the large central opening 44 from the cooling-chamber is continued downward through the stand-pipe and through the top 64 of the separator into the chamber therein.

All parts are of the desired sizes, proportions, and materials, preferably tin or galvanized sheet metal. Aside from the details above mentioned the exact shape of parts is immaterial, though I prefer to make them of cylindrical contour for the sake of greater cheapness and ease in cleaning.

With the above construction of parts the milk is poured into the receiver and flows down the bottom thereof through the holes around the cone, its passage therethrough being more or less restricted by the regulator, if desired, so that the milk will pass very slowly, indeed, out of the receiver for a purpose to appear below. Flowing past the spreader 6, it drops onto the convex cover 31 of the stopper, flows over its flange and falls into the collector 33, and is thereby carried inward again and drops through the holes 34 onto the top 26 of the tank, which has previously been filled with cold water or water and ice. Spreading out into a very thin sheet, it flows outward over this top and down the sides of the tank, which are slightly remote from the surrounding walls of the cylinder comprising the cooling-chamber. Trickling off the tank, it falls onto the bottom 41, whereby it is directed inward into the groove 42. Dropping thence through the holes 45, it flows down the inner face of the cylinder 50, comprising the stand-pipe, and finally reaches the separating-chamber, wherein it accumulates and is kept cool in the manner above described, and its depth is seen on an indicator 100. In the practical use of this device a large quantity of milk is poured at one time into the receiver; but the openings in the bottom thereof are so fine that it trickles very slowly out of this receiver, whereby its passage along the course outlined above is very slow, and especially over the water-tank, in an extremely-thin sheet. By this operation the animal heat it taken out before it can produce any bad effect on the milk and the butter-fat, the chance for fermentation is thus greatly reduced, the butter-fat will bind itself more readily, and thorough aeration of the milk will be effected, especially if the parts are provided with the large holes 48 and 58, as shown. Those in the cooling-chamber allow the air to gain access to the milk flowing over the water-tank, thus aerating the outer surface of the sheet simultaneously with the cooling of its inner surface, while the holes in the wall of the stand-pipe where the sheet flows across them permit the air to gain access to both faces of the thin sheet of milk, thus aerating it on both surfaces simultaneously. In the collector 33 and in the groove 42 may be placed a small quantity of ice, as shown in dotted lines. The ice in the collector is melted rather rapidly by the warmth of the inflowing milk, while that in the groove melts rather slowly, because the milk flowing over it is cooled. The water resulting from the melting of the ice at both places mingles with the milk, and as the latter flows slowly down the inner face of the stand-pipe the watery substance, being heavier and thinner, will separate itself from the cream and from the butter-fat. This separation also takes place when the liquid comes to rest in the separating-chamber, and an experienced eye can detect through the indicator 100 the lines of demarcation between the various grades of liquid therein. After all the milk has passed into the separating-chamber and stood there for some little time the different grades of liquid are drawn off one at a time from the bottom by means of the faucet, as will be clearly understood. If the bottom of this chamber is inclined, as shown, the indicator must be close to the faucet, which latter is at the lowest point of the slanting bottom. The ice may be renewed from time to time in an obvious manner, and when the cork is withdrawn by means of the chain the water in the tank flows through the other parts and cleanses them.

What is claimed as new is—

1. A milk-cooler comprising a receiver whose bottom is inclined inward and provided with feed-openings near its center, a spreader beneath said openings, a collector beneath the spreader and adapted to contain ice, a cooling-tank beneath the collector over which the milk flows in a thin sheet, a cooling-chamber surrounding said tank and having an inwardly-inclined bottom, an upright stand-pipe into which said bottom delivers, and a separating-chamber, all as and for the purpose set forth.

2. A milk-cooler comprising a receiver whose bottom is inclined inward and provided with feed-openings near its center, a cooling-tank beneath the openings and over which the milk flows in a thin sheet, a cooling-chamber surrounding said tank and having an inwardly-inclined bottom with a large central opening, an annular groove surrounding this opening and adapted to contain ice, the bottom of the groove having holes, an upright stand-pipe to whose inner face the milk is delivered by said holes, and a separating-chamber, as and for the purpose set forth.

3. In a milk-aerator, the combination with a cooling-tank upon which the milk is delivered and over which it flows in a thin sheet; of a cooling-chamber surrounding said tank and having means for permitting the aeration of the exterior of said sheet, an upright stand-pipe down whose inner face the milk next flows, the body of this pipe being pierced with a number of large openings whereby air is admitted to both surfaces of the milk, and a separating-chamber beneath, all as and for the purpose set forth.

4. In a milk-aerator, the combination with a cooling-tank upon which the milk is delivered and over which it flows in a thin sheet; of a cooling-chamber comprising a cylinder surrounding and remote from said tank and pierced with a number of openings whereby air is admitted to the exterior of said thin sheet, an upright stand-pipe down whose inner wall the milk next flows in a thin sheet, means for admitting air to the inner face of this sheet, and a collecting-chamber, as and for the purpose set forth.

5. In a device of the character described, the combination with a cooling-tank over which the milk flows, and an upright stand-pipe down whose inner face the cooled milk passes in a thin sheet; of a separating-chamber having an inclined bottom with a cock at its lowest point, means for cooling the bottom thereof, an inlet-opening through the top of the chamber to which said stand-pipe delivers, and a channel around said opening adapted to carry a stream of cold water, all as and for the purpose set forth.

6. In a milk-cooler, the combination with the cooling-tank, the cooling-chamber comprising a cylinder surrounding and rising above said tank, and an outlet from this cylinder; of the receiver consisting of a cylinder larger than that of the chamber, feet within the larger cylinder resting on the upper edge of the smaller, an inwardly-inclined bottom in the receiver having feed-openings near its center, and a spreader consisting of a narrow corrugated sheet secured beneath said bottom with its reëntrant angles below said openings, as and for the purpose set forth.

7. In a device of the character described, the combination with a receiver having fine feed-openings in its bottom, and the cooling mechanism located beneath said holes; of regulators consisting of a number of plugs each having a cylindrical body adapted to fit one hole and a large head at its upper end slightly flattened on its opposite sides, as and for the purpose set forth.

8. In a device of the character described, the combination with a receiver having fine feed-openings in its bottom, and the cooling mechanism located beneath said holes; of regulators consisting of a number of plugs each having a cylindrical body adapted to fit one hole and a large head at its upper end slightly flattened on its opposite sides, said sides also being provided with grooves growing deeper toward the upper end and connected by a notch passing across the head, as and for the purpose set forth.

9. In a milk-cooler, the combination with the cooling-chamber, an exhaust therefrom, and a receiver supported thereby and having feed-openings at its center; of a water-tank comprising a cylindrical body smaller than said chamber, a flat bottom provided with feet, a top inclining upward from the periphery to a central raised collar, a cap removably surrounding the collar, a closed convex cover on the cap and having a flange projecting beyond it, and a collector surrounding the cap and delivering the milk onto the top of the tank around said collar, as and for the purpose set forth.

10. In a milk-cooler, the combination with a chamber at the bottom, a stand-pipe rising therefrom, and a cooling-chamber whose bottom delivers to the inner wall of said stand-pipe; of a receiver having feed-openings in its bottom, and a water-tank removably inserted within said cooling-chamber and having a central exhaust-tube in its bottom, a cork closing the same, a water-inlet in its top surrounded by a collar, a chain attached within the collar and connected to the cork, and a stopper covering the collar and directing the milk from said feed-openings onto the top of the tank, all as and for the purpose set forth.

11. In a milk-cooler, the combination with the receiver whose bottom is inclined inward and provided with feed-openings near its center, a spreader beneath said openings, a cooling-tank located beneath the spreader, and a separating-chamber; of a collector between said spreader and tank, and a cap removably closing the inlet-opening to the tank and extending permanently through the center of said collector, all as and for the purpose set forth.

12. In a milk-cooler, the combination with the cooling-tank, and means for delivering the milk onto and passing it over the same; of a cylinder surrounding the tank and having an inwardly-inclined bottom with a large central opening, a depending collar around said opening, a strip secured within the collar and having an upright flange forming a groove provided with perforations, and a stand-pipe connected with said collar and leading downward to a receptacle, all as and for the purpose set forth.

In testimony whereof I have hereunto subscribed my signature this the 21st day of February, A. D. 1900.

PHILIP O. HIRSCH.

Witnesses:
 EMIL KOEHN,
 HARRY LODER.